United States Patent [19]
Allart et al.

[11] Patent Number: 6,099,273
[45] Date of Patent: Aug. 8, 2000

[54] HYDRAULIC MOTOR WITH FUNCTION SELECTOR

[75] Inventors: Bernard Allart, Crepy-en-Valois; Jean-Claude Cousin, Pontpoint; Eric Blondeau, Crepy-en-Valois, all of France

[73] Assignee: Poclain Hydraulics Industrie, Verberie, France

[21] Appl. No.: 09/203,026

[22] Filed: Dec. 1, 1998

[30] Foreign Application Priority Data

Dec. 2, 1997 [EP] European Pat. Off. .............. 97402898

[51] Int. Cl.[7] ..................................... F04B 39/10
[52] U.S. Cl. ........................... 417/491; 180/308; 91/506; 91/492; 91/472; 60/425
[58] Field of Search ........................... 417/491; 180/308; 91/506, 492, 472; 60/425

[56] References Cited

U.S. PATENT DOCUMENTS

| | | | |
|---|---|---|---|
| 3,750,534 | 8/1973 | Leutner et al. ........................... | 91/506 |
| 3,863,447 | 2/1975 | Foster et al. ............................. | 60/425 |
| 3,884,198 | 5/1975 | Foster et al. ............................. | 91/472 |
| 4,356,761 | 11/1982 | Cameron-Johnson . | |
| 4,503,928 | 3/1985 | Mallen-Herrero et al. .............. | 180/308 |
| 4,532,854 | 8/1985 | Foster ....................................... | 91/472 |
| 5,558,003 | 9/1996 | Bauzou et al. ........................... | 91/492 |

FOREIGN PATENT DOCUMENTS 0601916 6/1994 European Pat. Off. .

*Primary Examiner*—Timothy S. Thorpe
*Assistant Examiner*—Steven Brown
*Attorney, Agent, or Firm*—Ladas & Parry

[57] ABSTRACT

Pressurized fluid motor comprising a casing, a cylinder block, a cam, an internal fluid distributor and a selector. The bore of the selector has four grooves. Two of them are communication grooves each connected to a main (feed or exhaust) power duct and to a connection duct, the connection ducts being themselves connected to different groups of distribution ducts. The other two grooves of the bore are branch grooves respectively connected to an additional (feed or exhaust) power duct and to a third connection duct. The slide of the selector comprises at least a first selection groove which is adapted to establish communication between the two branch grooves. By modifying only the shape of the slide, and possibly that of the bore of the additional duct, the selector can provide different functions.

12 Claims, 8 Drawing Sheets

HYDRAULIC MOTOR WITH FUNCTION SELECTOR

FIELD OF THE INVENTION

The present invention concerns a pressurized fluid motor comprising:

- a casing which includes two main power ducts, respectively a fluid feed duct and a fluid exhaust duct;
- a cylinder block which includes a plurality of cylinders each equipped with a piston, said cylinders being disposed radially relative to an axis and adapted to be fed with pressurized fluid;
- a reaction member adapted to cooperate with the pistons, said reaction member and the cylinder block being able to rotate relative to each other about the axis;
- an internal fluid distributor rotating with the reaction member about the rotation axis and having distribution ducts adapted to communicate with the cylinders, said distribution ducts being divided into three groups of distribution ducts; and
- a selector comprising a bore and a slide, the bore having a substantially cylindrical face with at least three grooves, the two main ducts and three connection ducts which are respectively connected to each of the three groups of distribution ducts being connected to said bore, the slide being mounted in the bore and having at least a first selection groove on its outside periphery, said slide being adapted to be moved between two positions in which said selection groove isolates and/or establishes communication between certain grooves of said bore.

BACKGROUND OF THE INVENTION

Motors of the above type are known in which the selector is used to select the capacity. This is the case with the low-speed motor described in French Patent No. 2 699 299 which has two active operating capacities, for example. In this case, in one position of the slide of the selector, the two capacities are activated whereas in the other position only one of them is activated.

OBJECTS AND SUMMARY OF THE INVENTION

The present invention aims to improve a motor of the above kind so that a single basic unit, consisting of the essential components of the motor, provides the basis for different functions merely by changing the slide of the selector and possibly by providing an additional bore. In other words, the invention aims to provide a very high level of modularity and a diverse range of functions based on a common basic motor structure.

The above aim is achieved by virtue of the fact that the motor includes an additional power duct constituting a fluid feed duct or a fluid exhaust duct, the bore of the selector has four annular grooves on said substantially cylindrical face and spaced from each other, said grooves comprising two "communication" grooves and two "branch" grooves, a first of the two main ducts and the first connection duct being permanently connected to the first communication groove, the second of the two main ducts and the second connection duct being permanently connected to the second communication groove, the additional duct being permanently connected to the first branch groove and the third connection duct being permanently connected to the second branch groove, and the first selection groove of the slide is adapted to establish communication between the two branch grooves of the bore.

The expression (main or additional) power duct designates a duct that conveys the fluid directly assuring relative rotation of the cylinder block and the reaction member, so that the power duct therefore conveys fluid to or from the cylinders.

Depending on the rotation direction of the motor, a power duct can be either a fluid feed duct or an exhaust duct. In addition to the power ducts, the casing normally includes at least one other duct referred to as the "leak return duct" that opens into the internal cavity of the casing, for example in the vicinity of the reaction member, and which is used to evacuate small quantities of fluid that can collect in this cavity because of leaks that occur in particular between the pistons and the cylinders or between the distributor and the cylinder ducts.

The basic structure of the motor comprises the essential components consisting of the casing, the cylinder block, the reaction member, the distributor and the selector bore. The selector bore has four grooves. The communication grooves have the standard function of fluid feed or exhaust to the distributor the ducts of which are themselves connected to the cylinders. As will become clear later, the branch grooves can assure diverse functions by choosing diverse forms for the selector slide. The slide includes at least the first selector groove which in one position of the slide establishes communication between the two branch grooves.

In this position the two grooves can implement the function of a third groove similar to the communication grooves (except that they are connected to the additional duct), for example to select the capacity when the motor has two working capacities.

To achieve this the slide can include a single selector groove which in the first position establishes communication between the two branch grooves and one of the communication grooves and in the second position establishes communication between the two branch grooves and the other communication groove.

To give the motor a different function all that is required is to change the slide of the selector, for example by choosing a slide having two selector grooves. In some cases an additional bore may also be formed to establish permanent communication between the two branch grooves.

In an advantageous arrangement, the grooves of the bore in the selector being numbered 1 through 4 when they are considered in turn from a first to a second end of the substantially cylindrical face of the bore, the first and the fourth grooves are communication grooves and the second and the third grooves are branch grooves.

This arrangement enables selection of communication between or relative isolation of the communication grooves and/or the branch grooves with a compact arrangement and a short travel of the slide of the selector, as will become clear later.

In one embodiment the branch grooves are blind grooves, only the additional duct is permanently connected to the first branch groove and only the third connection duct is permanently connected to the second branch groove.

BRIEF DESCRIPTION OF THE DRAWINGS

The invention will be clearly understood and its advantages will become more apparent on reading the following detailed description of embodiments given by way of non-limiting example only. The description refers to the accompanying drawings, in which.

MORE DETAILED DESCRIPTION

Figure 1:
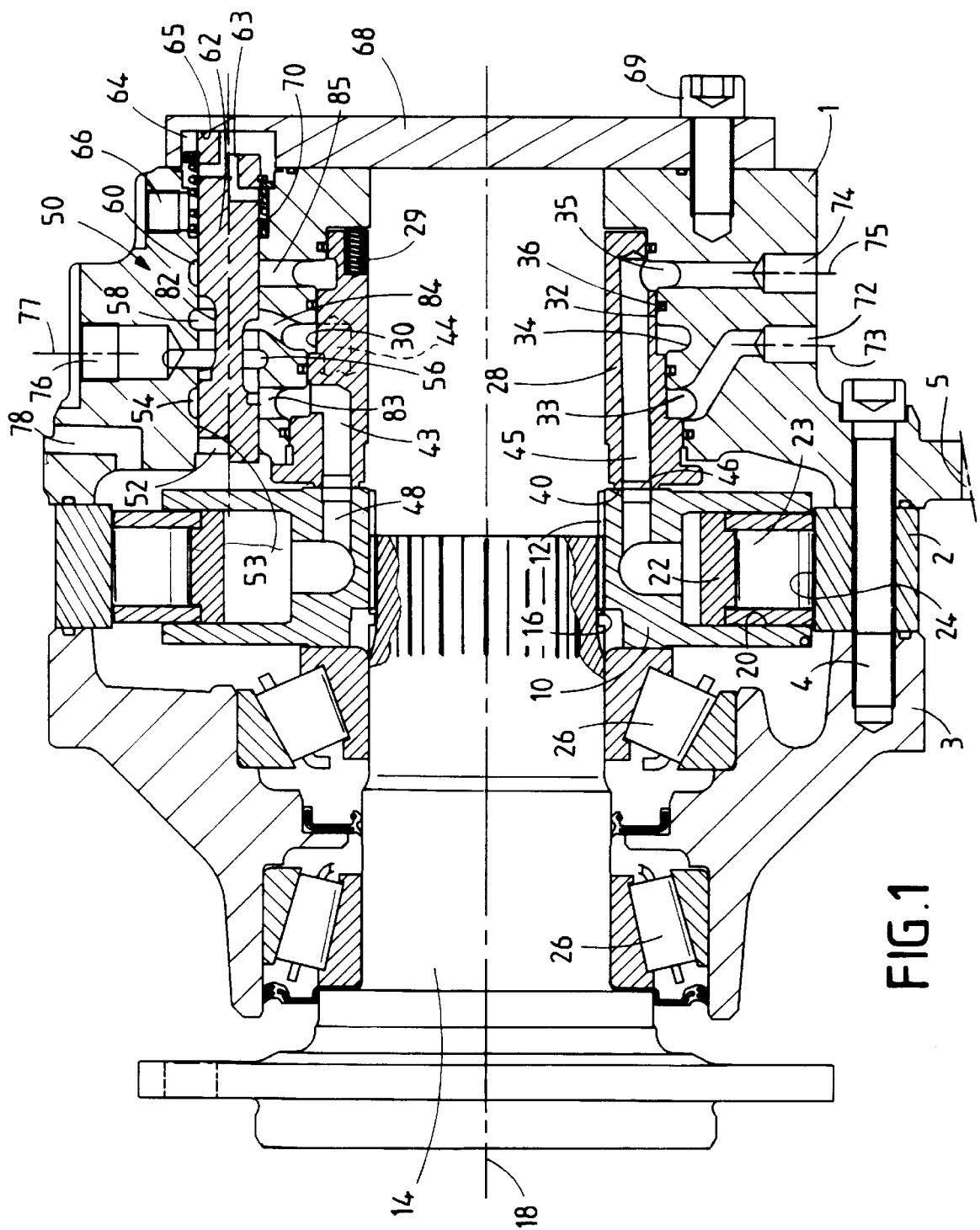
FIG. 1 is a diagrammatic view in axial section of a motor in accordance with the invention.

The hydraulic motor shown in FIG. 1 is a low-speed high-torque hydraulic motor, for example, including:

a casing comprising three parts 1, 2, 3 assembled together by bolts 4, a cylinder block 10 which has a central bore provided with splines 12, a shaft 14 passing through the bore and having at the end splines 16 co-operating with the splines 12 so that the shaft 14 and the cylinder block 10 are constrained to rotate together about the rotation axis 18, cylinders 20 in the cylinder block 10 and disposed radially relative to the axis 18, pistons 22 each sliding in a cylinder 20, a reaction member comprising, for example, an undulating cam 24 on the inside periphery of the intermediate part 2 of the casing, the cam being adapted to cooperate with rollers 23 at the ends of the pistons 22, and bearings 26 supporting the shaft 14 for rotation relative to the casing part 3, the combination of the shaft 14 and the cylinder block 10 being able to rotate about the axis 18 relative to the casing of the motor.

The casing part 1 has a lug 5 enabling it to be fixed to the chassis of a vehicle, for example. The motor shown by way of example is therefore a so-called "rotating shaft" motor, the casing of which does not rotate.

The motor further includes an internal fluid distributor 28 which rotates with the cam 24 about the axis 18. The distributor has a substantially axial face 30 having a succession of shoulders. The distributor 28 is disposed in an axial housing in the casing part 1. The axial face 30 of the distributor faces an axial face 32 of the housing in which there are three grooves 33, 34 and 35. Each groove opens at the radially innermost end onto a different section of the axial face 30 of the distributor 28, delimiting three chambers sealed by seals 36.

The distributor has a flat distribution face 40 perpendicular to the axis 18. The distributor includes distribution ducts which open onto the face 40 and into one of the grooves 33, 34 and 35. There are three groups of distribution ducts 43, 44 and 45, according to which of the three grooves they open into. Accordingly, two ducts 43 and 45 belonging to different groups and both opening onto the face 40 and respectively into the grooves 33 and 35 can be seen in the section plane, whereas the duct 44 is merely indicated in dashed outline. The openings from the distribution ducts onto the face 40 are all centered on a common circle and equi-angularly spaced.

The cylinder block has a flat communication face 46 perpendicular to the axis 18. Cylinder ducts 48 connect the working chamber of each cylinder to the communication face 46 onto which they open on the same circle centered on the axis 18 as the distribution ducts 43, 44 and 45. The distribution face 40 of the distributor 28 is pressed against the communication face 46 (for example by springs 29 and/or by hydraulic balancing). The distribution ducts of the distributor are therefore able to communicate sequentially with the cylinders 20 as the cylinder block rotates relative to the casing.

The motor further includes a selector 50 including a bore 52 which, in the example shown, is an axial bore in the casing part 1. This bore has four annular grooves 54, 56, 58 and 60 which, in the example shown, are therefore all transverse to the axis 18. The four grooves of the bore are formed in the cylindrical or substantially cylindrical face 53 of the bore.

A slide 62 is mounted in the bore 52 in which it can slide between two positions. To command displacement of the slide the bore includes a pilot chamber 64 fed with pressurized fluid via an external duct 66. This chamber communicates with an end 63 of the slide 62 which forms a pilot piston. When the chamber 64 is in communication with the pressurized fluid, the fluid tends to displace the slide 62 from its first position to its second position in which its end 63 is at a distance from the corresponding end wall 65 of the chamber, this position being that shown for the bottom half of the selector 50 in FIG. 1. The end wall 65 of the chamber is formed in a transverse closure plate 68 at the end of the casing part 1 fixed by means of bolts 69. A spring 70 in the pilot chamber 64 opposes the action of the fluid in that chamber. Consequently, the spring tends to return the slide to its first position in which its end 63 is near the end wall 65 of the chamber, which position is that shown for the top half of the selector 50 in FIG. 1.

FIG. 1 shows that the motor casing, to be more precise the casing part 1, includes three power ducts. Firstly there are two so-called "main" ducts 72 and 74 which open into the respective grooves 33 and 35. These ducts are respectively connected to external ducts 73 and 75. Depending on the rotation direction of the motor, the main ducts 72 and 74 can be a fluid exhaust duct and a fluid feed duct, respectively, or vice versa. Then there is an additional power duct 76 connected to an external duct 77. The location of the duct 76 will be explained later.

In addition to the three power ducts 72, 74 and 76 the casing includes a leak return duct 78.

The casing part 1 further includes three connection ducts 83, 84 and 85. The duct 83 is connected to the group of distribution ducts 43 connected to the groove 33 and the connection ducts 84 and 85 are respectively connected to the two groups of distribution ducts 44 and 45 respectively connected to the grooves 34 and 35.

The connections between the various ducts and the four annular grooves in the cylindrical face of the bore 52 are organized in the following manner:

the first main duct 72 and the first connection duct 83 are both connected permanently to the groove 54, which is called "first communication groove"(for example, the connection duct 83 could open at the radially innermost end into the groove 54 and the first main duct 72 into the same groove but at the radially outermost end; the duct 72 could be directly connected to the duct 83 in turn opening into the groove 54; as in the example shown, the duct 72 could open directly into the groove 33 and, the duct 83 connecting the groove 33 to the groove 54, the two ducts 72 and 83 could both be connected to the groove 54);

the additional duct 76 is permanently connected to the groove 56, called the "first branch groove" (the duct 76 opens directly into the groove 56 at the radially outermost end, for example);

the connection duct 84, hereinafter referred to as the "third connection duct", is permanently connected to the groove 58, hereinafter referred to as "the second branch groove" (the duct 84 opens directly into the groove 58 at the radially innermost end, for example);

finally, the second main duct 74 and the connection duct 85, hereinafter referred to as the "second connection duct" are permanently connected to the groove 60, hereinafter referred to as the "second communication groove" (the connection between these ducts and the groove 60 can be made in the manner previously described with reference to the groove 54 and the ducts 72 and 83).

The grooves 54 and 60 are respectively called the first and second communication grooves because they respectively establish communication of the two groups of distribution ducts 43, 45 with the two main power ducts 72, 74 via the first two connection ducts 83, 85. On the other hand, the grooves 56 and 58 are called the first and second branch grooves in that they are primarily and respectively connected to the additional duct 76 and to the third connecting duct 84 and, depending on the position of the slide 62, they can divert fluid either to the third group of distribution ducts 44 opening into the groove 34 or to one group 43 or the other group 45 opening into the grooves 33 or 35. The motor therefore comprises two half-motors with different capacities, the group of distribution ducts 44 belonging to one of the two half-motors, the group of distribution ducts 45 belonging to the other of the two half-motors, while the group of distribution ducts 43 has ducts 43 belonging to or other of the two half-motors, the number of ducts 43 being equal to the sum of the numbers of ducts 44 and ducts 45.

The slide 62 shown in FIG. 1 has a single groove 82 in the form of an annular depression at its outside periphery. In the remainder of the description the groove(s) in the slide of the selector will be called "selection grooves".

As previously mentioned, the motor shown by way of example in FIG. 1 is a so-called "rotating shaft" motor. Note that the selector bore is in a portion of the casing part 1 of the motor relatively far away from the axis 18. Also, the bore is an axial bore, parallel to the axis 18. An arrangement of this kind is generally chosen for a rotating shaft motor, but other arrangements are possible.

However, the invention can equally be applied to motors of a different type, known as "rotating cam" motors, in which the distributor and the cam rotate while the cylinder block and the shaft do not rotate. The distribution ducts then open into grooves between the distributor and a feed part that does not rotate, this feed part incorporating feed and exhaust ducts that open into these grooves. In this case, the bore of the selector of the motor in accordance with the invention can be in the feed part or in the interface region between that part and the distributor. The selector operates in the way previously described with reference to FIG. 1.

The operation of the selector 50 equipping a first embodiment of a motor in accordance with the invention and an application of two motors of this type in a hydraulic circuit will now be described with reference to FIGS. 1 through 3.

The slide 62 of the selector 50 from FIG. 1 has a single selection groove 82. When the slide is in its first position as shown in the top part of the bore the two branch grooves 56 and 58 communicate with each other and are isolated from the communication grooves 54 and 60. When the slide 62 is in its second position as shown in the bottom part of the bore the two branch grooves 56 and 58 communicate with each other and also with one of the communication grooves (here the first groove 54) and isolates from these three grooves the other communication groove (here the second communication groove 60).

When using the advantageous arrangement in which the two branch grooves 56 and 58 are between the two communication grooves 54 and 60, the embodiment described hereinabove is simply obtained by making the length of the groove 82 greater than the distance between the two grooves 56 and 58 and at most substantially equal to the distance between the groove 54 and the branch groove at the greatest distance from it (here the groove 58). In the first position of the slide the groove 82 is substantially centered on the two grooves 56 and 58 and establishes communication between them whilst isolating them from the two grooves 54 and 60. In the second position the groove 82 is substantially centered on the groove 56 and therefore establishes communication between the three grooves 54, 56 and 58 whilst isolating the groove 60.

Figure 2:
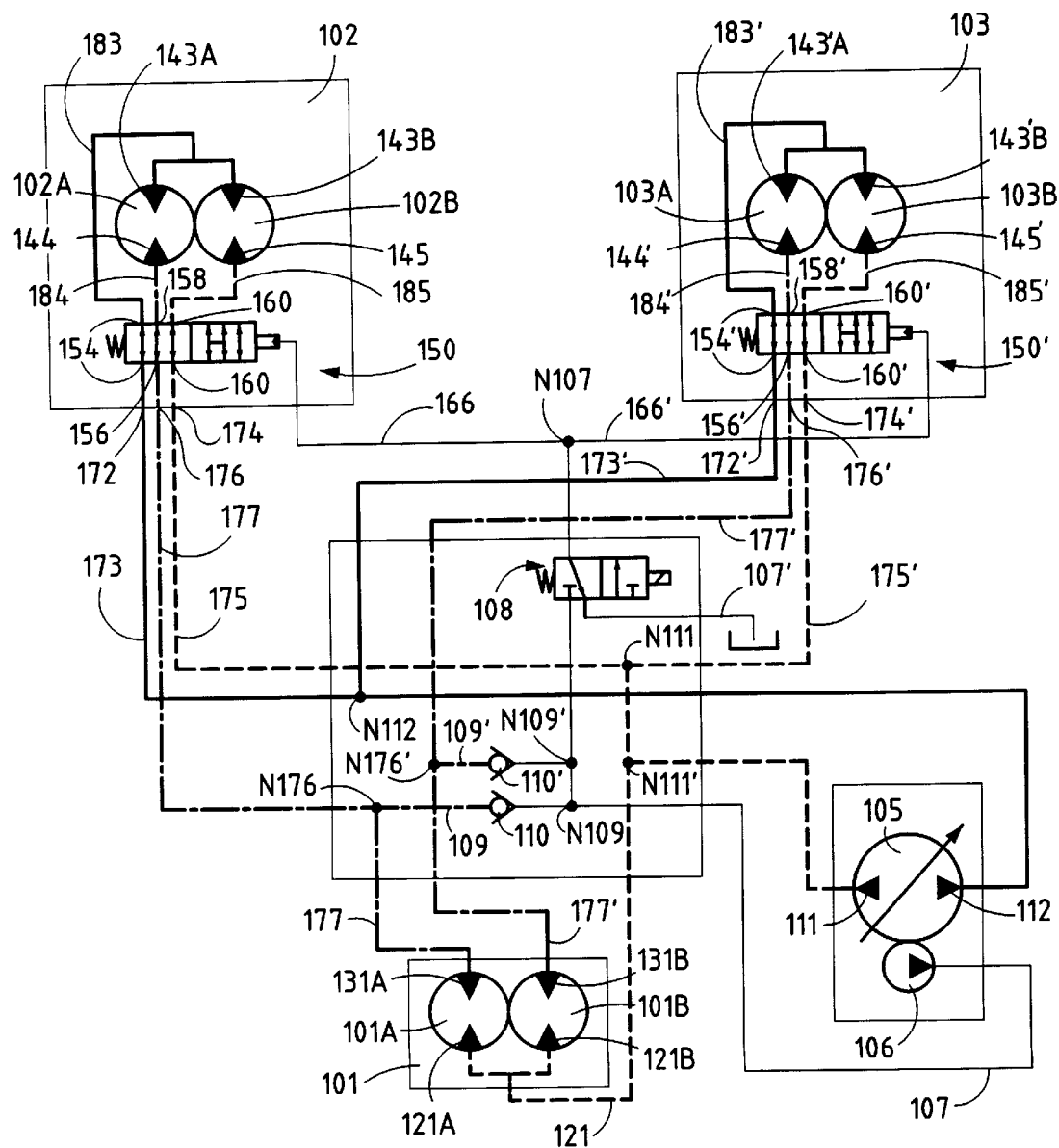
FIGS. 2 and 3 are two schematics of the same control circuit integrating two motors analogous to that from FIG. 1, respectively corresponding to each of the two positions of the selectors of the two motors.
Figure 3:
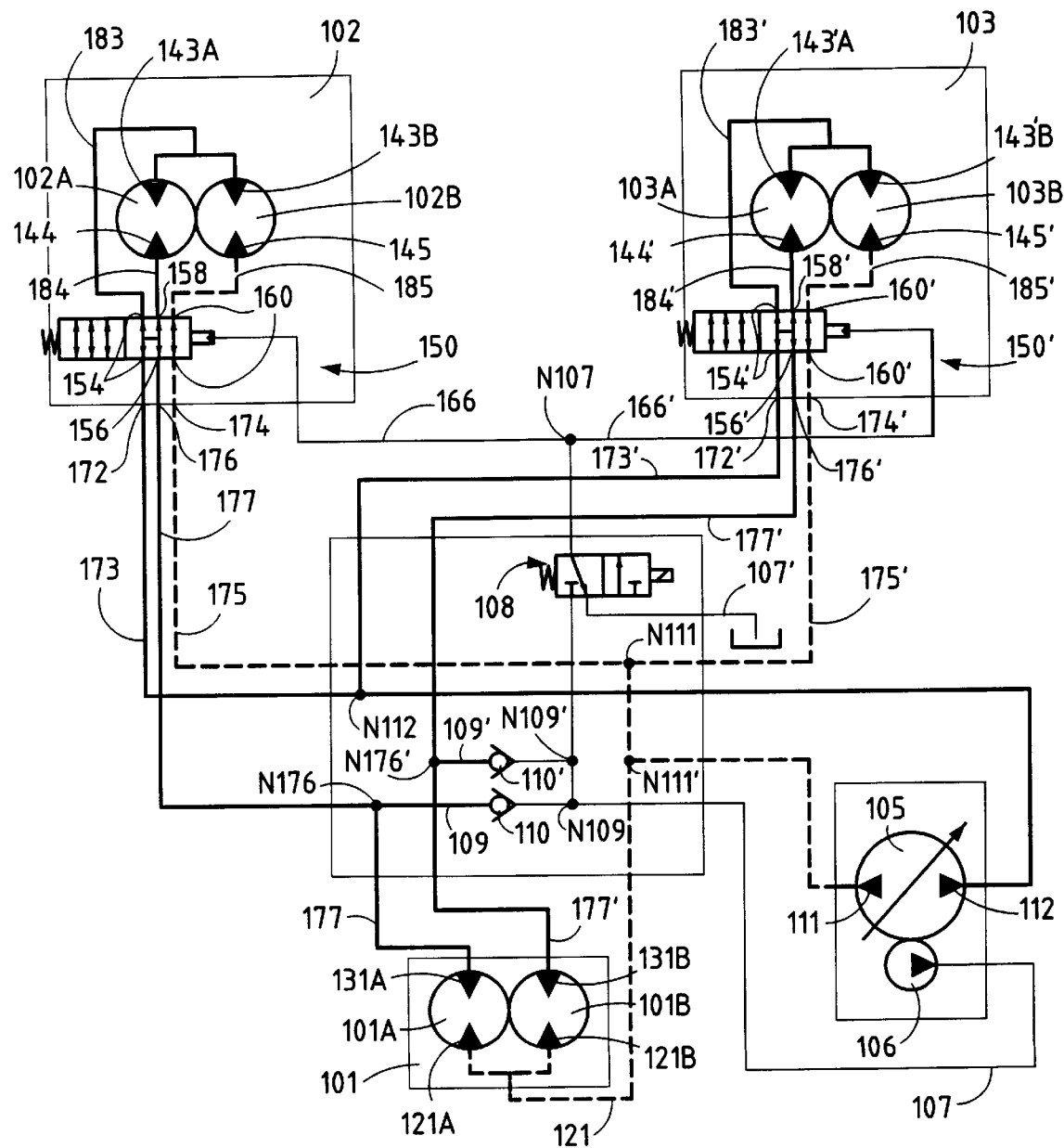

The above embodiment is advantageously employed in the control circuit shown in FIGS. 2 and 3. The circuit includes three hydraulic motors 101, 102 and 103 and can be used on a vehicle with three wheels or groups of wheels, or more generally with three groups of displacement members. The motors each have two different working capacities and are therefore each represented by two half-motors, respectively 101A and 101B, 102A and 102B, 103A and 103B. The two hydraulic motors 102 and 103 are like the motor from FIG. 1 and both are equipped with a respective selector 150, 150'.

Pressurized fluid is supplied to the motors by a variable output pump 105 fitted with main connectors 111 and 112 which, depending on the direction in which the pump is working, are feed ducts or exhaust ducts.

The motors 102 and 103 each have two main power (feed or exhaust) ducts 172 and 174 for the motor 102, 172' and 174' for the motor 103. Each also includes an additional power (feed or exhaust) duct 176 for the motor 102 and 176' for the motor 103.

The first main ducts 172 and 172' of the motors 102 and 103 are connected to the pump connector 112 by external ducts 172 and 173' and by a node N112. The second main ducts 174 and 174' are connected to the pump connector 111 by external ducts 175 and 175' and by a node N111. The connector 111 is also connected to a main duct 121 of the motor 101 by a node N111'. The main duct 121 is connected to the two half-motors 101A and 101B by respective main distribution duct connectors 121A and 121B.

As in the motor from FIG. 1, the first main ducts 172 and 172' are respectively connected to the first communication grooves 154 and 154' of the selectors 150 and 150'. The second main ducts 174 and 174' are respectively connected to the second communication grooves 160 and 160' of the selectors 150 and 150'.

The additional ducts 176 and 176' are respectively connected to the first branch grooves 156 and 156' of the selectors.

The motors 102 and 103 also include connection ducts connected to the distribution ducts. The first connection ducts 183 and 183' are respectively connected to the grooves 154 and 154', the second connection ducts 185 and 185' are respectively connected to the second communication grooves 160 and 160' and the third connection ducts 184 and 184' are respectively connected to the second branch grooves 158 and 158'.

The first connection duct 183 is connected to the distribution ducts 143A and 143B of the two half-motors 102A and 102B of the motor 102. Similarly, the first connection duct 183' is connected to the distribution ducts 143'A and 143'B of the half-motors 103A and 103B. On the other hand, the second connection ducts 185 and 185' are connected only to the half-motors 102B and 103B, respectively by the distribution ducts 145 and 145'. Finally, the third connection ducts 184 and 184' are respectively connected only to the half-motors 102A and 103A, respectively by the distribution ducts 144 and 144'.

Note further that the additional ducts 176 and 176' are respectively connected to the half-motors 101A and 101B of the motor 101 via the external ducts 177 and 177', respectively by the distribution duct connectors 131A and 131B.

To explain more clearly how the circuit works, the ducts connected to the connector 112 of the pump 105 are shown in bold line, the ducts connected to the pump connector 111 are shown in dashed line and the ducts connected to the additional ducts of the motors 102 and 103 are shown in chain-dotted line.

The ducts of the control circuit for the connectors 150 and 150' are shown in thin line. They include a supercharging duct 107 connected to the output of a supercharging pump 106. The duct 107 includes a control valve 108 (for example a solenoid valve). Pilot ducts 166 and 166' for the slides of the selectors 150 and 150' are connected to the duct 107 by a node N107. When the valve 108 is in its first position as shown in FIG. 1 it prevents the fluid flowing in the duct 107 reaching the node N107. Consequently, the slides of the selectors 150 and 150' are in their first position. With the valve 108 in the same position, the section of the duct 107 between that valve and the node 107 is connected to a drain duct 107'. On the other hand, in the second position of the valve 108, as shown in FIG. 3, the fluid flows in the duct 107 as far as the node N107 and feeds the pilot ducts 166 and 166', so displacing the slides of the selectors 150 and 150' to their respective second position. Because of this control circuit, the selectors 150 and 150' are commanded simultaneously either into their first position or into their second position.

Sections of ducts 109 and 109' including check valves 110 and 110' are connected to the duct 107 by nodes N109 and N109'. The ducts 109 and 109' are respectively connected to the ducts 176 and 176' by respective nodes N176 and N176'. The check valves allow the fluid to flow in the direction from the duct 107 to the ducts 176 and 176'. They can be incorporated into the motors.

In FIG. 2 the slides of the selectors 150 and 150' are both in their first position corresponding to the position of the top part of the slide 62 in FIG. 1. For clarity the same reference numbers are used for the grooves of the selector 150 as are used for those of the selector 50 from FIG. 1 but increased by 100 and the same reference numbers are used for the selector 150' as are used for the selector 150 but "primed".

In the first position of the slides of the selectors both branch grooves 156 and 158 (respectively 156' and 158') communicate with each other and are isolated from the communication grooves 154 and 160 (respectively 154' and 160').

Consequently, the additional ducts 176 and 176' are respectively connected to the third connection ducts 184 and 184' but isolated from the main ducts and from the first and second connection ducts.

The operation of the circuit from FIG. 2 will be described assuming that the pump connector 112 is a discharge connector that feeds the motors and the connector 111 is a suction connector connected to the exhaust of the motors.

In this case, the two capacities 102A and 102B of the motor 102 and the two capacities 103A and 103B of the motor 103 are fed with pressurized fluid by the first main ducts 172 and 172' and, via the grooves 154 and 154', by the first connection ducts 183 and 183'. On the other hand, the exhaust circuits are different for each of the half-motors. The half-motors 102A and 103A exhaust via the third connection ducts 184 and 184' and the additional ducts 176 and 176'. These ducts being connected to the connectors 131A and 131B of the motor 101, the exhaust from the two half-motors 102A and 103A feeds the half-motors 101A and 101B, respectively. From this point of view the motor 101 can be regarded as disposed in series relative to the half-motors 102A and 103A.

The half-motors 102B and 103B exhaust through the second connection ducts 185 and 185' and the second main ducts 174 and 174' which are connected to the exhaust connector 111 of the pump 105. Similarly, the half motors 101A and 101B exhaust via the duct 121 connected to the exhaust connector of the pump. From this point of view the motor 101 is in parallel with the half-motors 102B and 103B.

Of course, if the rotation direction of the pump is reversed the ducts 175, 175', 174, 174' and 121 feed the half-motors 102B and 103B and the two half-motors of the motor 101. The exhaust from these two half-motors feed the half-motors 102A and 103A, respectively. The half-motors 102A, 102B, 103A and 103B exhaust through the ducts 172 and 172'.

A circuit of the above kind installed on a vehicle prevents skidding of the drive members driven by the motors 101, 102 and 103. The motor 101 being in series with the two half-motors 102A and 103A, the speeds of the drive members driven by the motors 101, 102 and 103 are synchronized. The half-motors 102B and 103B being fed in parallel with the motor 101, there is no risk of any skidding of the drive members that they drive being transmitted to the member driven by the motor 101.

In FIG. 3 the slides of the selectors 150 and 150' are in their second position corresponding to the bottom half of the slide 62 shown in FIG. 1. Accordingly, the branch grooves 156 and 158 (respectively 156' and 158') communicate with each other and with the communication groove 154 (respectively 154').

Assuming, by way of example, that the pump connector 111 is a discharge connector, the half-motors 101A and 101B of the motor 101 are fed by the duct 121 whereas only the half-motors 102B of the motor 102 and 103B of the motor 103 are fed by the second main ducts 174 and 174' in parallel with the feed to the motor 101. The distribution ducts 143B and 143'B of the half-motors 102B and 103B are respectively connected to the first main ducts 172 and 172' by the first connection ducts 183 and 183'. Because of the position of the slides of the selectors, the distribution ducts 143A and 144 of the half-motor 102A and the distribution ducts 143'A and 144' of the half-motor 103A are also connected to the first main ducts 172 and 172', to which ducts the additional ducts 176 and 176' are also connected.

The consequence of this is that the half-motors 102A and 103A are deactivated and the exhausts of the half-motors 101A and 101B are finally connected to the suction connector 112 of the pump. Accordingly the two capacities of the motor 101 are activated but only the half-motors 102B and 103B of the motors 102 and 103 are activated and they are connected in parallel to the motor 101. In this configuration the synchronization of the speeds of the drive members (which is beneficial when traveling in a straight line) is eliminated in order to obtain a differential speed effect in turns.

Another embodiment will now be described with reference to FIG. 4. This figure is a partial view of a motor similar to that from FIG. 1, showing the selector region of the motor. The only difference compared to FIG. 1 is the shape of the slide 262. For simplicity, the reference numbers used in FIG. 1 are used for the components that are unchanged compared to that figure. Thus the two communication grooves of the bore 52 are designated by the reference numbers 54 and 60 and the two branch grooves of the bore are designated by the reference numbers 56 and 58. The slide 262 of the selector 250 has first and second selection grooves 281 and 282, respectively. In the first position of the slide, as shown in the top half of the bore, the first communication groove 54 and the first branch groove 56 communicate via the second selection groove 282 but are isolated from the second branch groove 58 and from the second communication groove 60. In this position of the slide the second branch groove 58 and the second communication groove 60 communicate via the first selection groove 281 but are isolated from the grooves 54 and 56.

On the other hand, in the second position of the slide, the first communication groove 54 is isolated from the other grooves of the bore 56, 58 and 60 and the branch grooves 56 and 58 communicate via the first selection groove 281. The second communication groove 60 is isolated from the other grooves of the bore.

For example, in the second position of the slide 262 the second selection groove 282 faces one of the communication grooves (here the first groove 54). The second position of the slide 262 corresponds to the first position of the slide 62 from FIG. 1 because it isolates each of the two communication grooves but establishes communication between the two branch grooves.

The length of the first selection groove 281 is at most substantially equal to the distance between the second branch groove 58 and the second communication groove 60 (which distance is itself substantially equal to the distance between the grooves 56 and 58). The length of the second selection groove 282 is at most substantially equal to the distance between the first communication groove 54 and the first branch groove 56.

Figure 4:
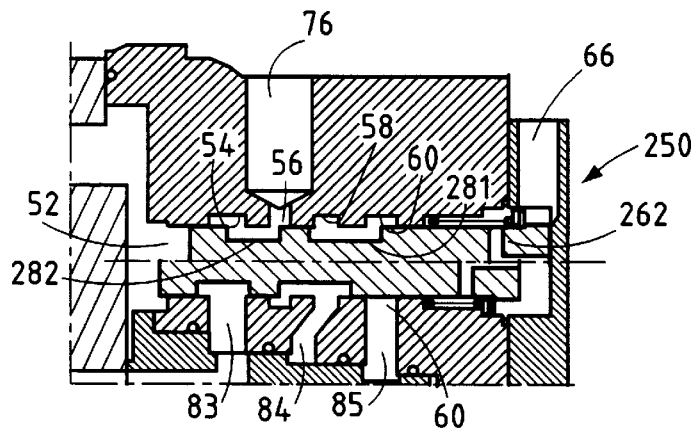
FIG. 4 is a partial diagrammatic view in axial section of the selector of a second embodiment of motor.
Figure 5:
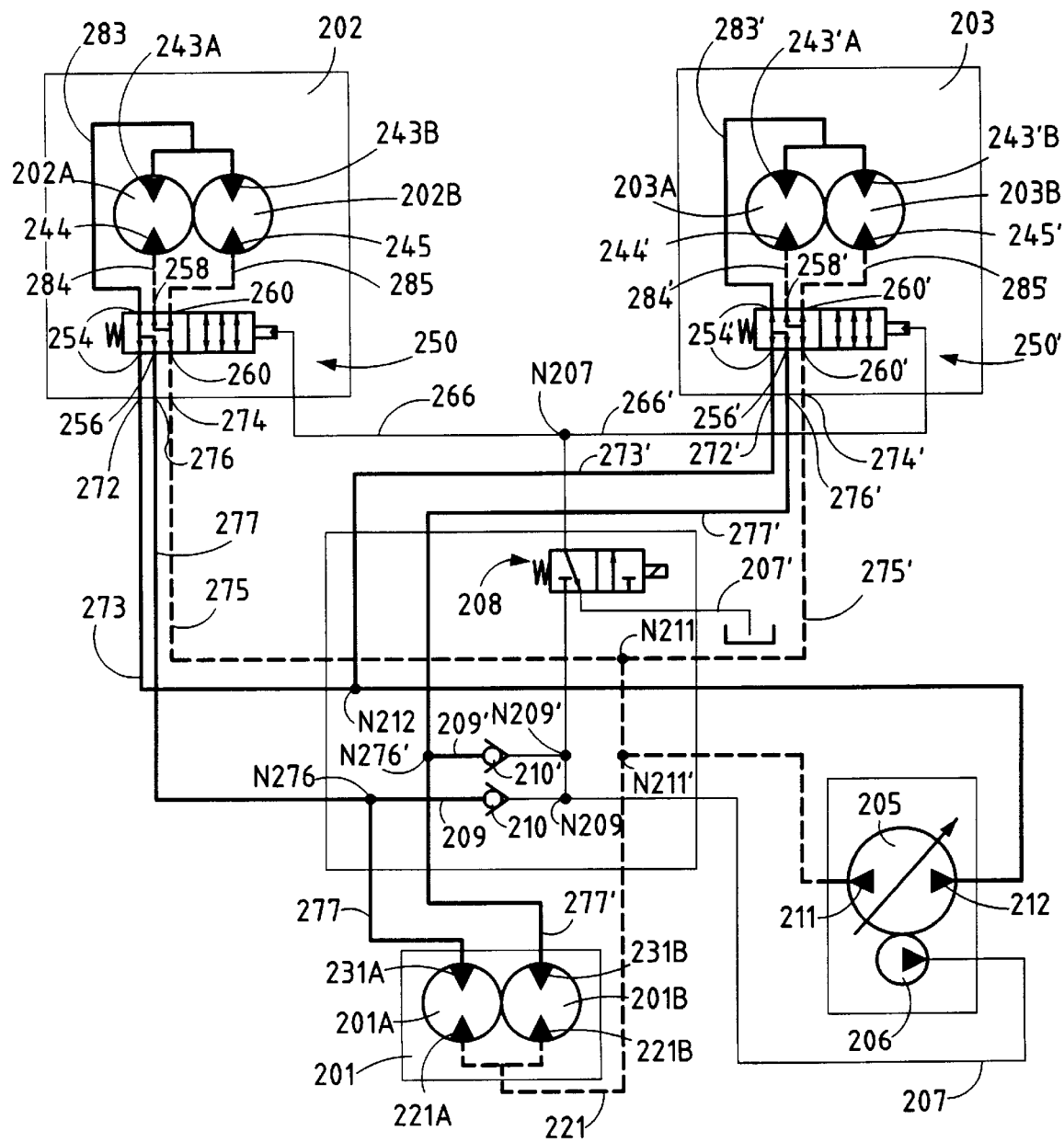
FIG. 5 is the schematic of a control circuit integrating two motors provided with a selector as shown in FIG. 5, for one position of the selector.

FIG. 5 shows a control circuit integrating two motors 202 and 203 conforming to the FIG. 4 variant. Apart from the modifications to the selectors of the two motors, the circuit is similar to that from FIGS. 2 and 3. Consequently, for simplicity, the same reference numbers are used in FIG. 5 as are used in FIGS. 2 and 3, but increased by 100. For clarity, all the ducts of the circuit that are connected to the connector 211 of the pump 205 are shown in dashed line, all the ducts that are connected to the connector 212 are shown in bold line and the ducts connected to the supercharging pump 206 and controlling the selectors 250 and 250' are shown in thin line.

Because of the conformation of the slides of the selector 250 and 250', when the latter are in their first position the second and third connection ducts 285 and 284 for the motor 202 and 285' and 284' for the motor 203 are respectively connected to the second main ducts 274 and 274' which are in turn connected to the first connector 211 of the pump 205, to which connector the duct 221 of the motor 201 is also connected. Thus the connectors 221A and 221B of the two half-motors of the motor 201, the distribution ducts 244 and 245 of the two half-motors of the motor 202 and the distribution ducts 244' and 245' of the two half-motors of the motor 203 are all connected to the pump connector 211.

The first connection ducts 283 of the motor 202 and 283' of the motor 203 are respectively connected to the additional ducts 276 and 276' which thus communicate with the first main ducts 272 and 272' and are finally connected to the second pump connector 212. Accordingly, the connectors 231A and 231B of the two half-motors of the motor 201, the distribution ducts 243A and 243B of the two half-motors of the motor 202 and the distribution ducts 243'A and 243'B of the half-motors of the motor 203 are all connected to the second pump connector 212.

Consequently, the three motors of the circuit are fed in parallel from the pump 205 and each of their half-motors is active. This configuration achieves a differential effect similar to that described in connection with FIG. 3, except that the motors 202 and 203 operate at full capacity so that the vehicle has a lower speed but greater traction.

In the second position of the slides of the selectors 250 and 250' the connections are the same as for the circuit from FIG. 2 previously described, the connectors 231A and 231B of the motor 101 are respectively in series with the distribution ducts 244 of the half-motor 202A and 244' of the half-motor 203A, and the other connections are made in parallel for the three motors 201, 202 and 203.

Figure 6:
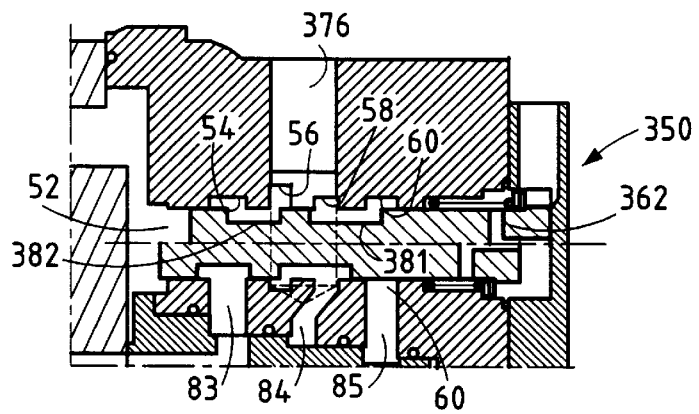
FIG. 6 is a view analogous to FIG. 4 for a different embodiment.

FIG. 6 shows another embodiment of the invention in which the slide is similar to slide 262 from FIG. 4 but in which the connecting bore of the additional duct is different. The slide 362 of the selector 350 from FIG. 6 has respective first and second selection grooves 381 and 382. The four grooves of the bore of the selector are unchanged and are therefore designated by the same reference numbers as previously. This time the additional duct is designated by the reference number 376. It differs from the duct 76 previously described in that it includes a bore which communicates not only with the first branch groove 56, like the duct 76, but also with the second branch groove 58. Accordingly, regardless of the position of the slide 362, the two grooves 56 and 58 are in permanent communication. In the first position of the slide 362 shown in the top half of FIG. 6 the second branch groove 58 and the second communication groove 60 communicates via the first selection groove 381 and the first communication groove 54 and the first branch groove 56 communicate via the second selection groove 382. Because of this particular implementation of the bore of the duct 376, the four grooves 54, 56, 58 and 60 communicate with each other in the first position of the slide 362 with the result that all the connection ducts of the motor are in communication and the motor is consequently inactivated. Of course, other devices for establishing permanent communication between the grooves 56 and 58 and the bore 376 could be provided, for example two bores respectively connected to the grooves 56 and 58 and communicating via an external bridging device.

On the other hand, in a second position of the slide 362 the first selection groove 381 faces only the grooves 56 and 58 while the second selection groove 382 faces only the first communication groove 54 and isolates it from the other grooves of the bore. The second communication groove 60 is also isolated from the other grooves by the cylindrical wall of the slide 362. In this case the two communication grooves 54 and 60 are isolated from the other grooves of the bore but the grooves 56 and 58 are still in communication.

Figure 7:
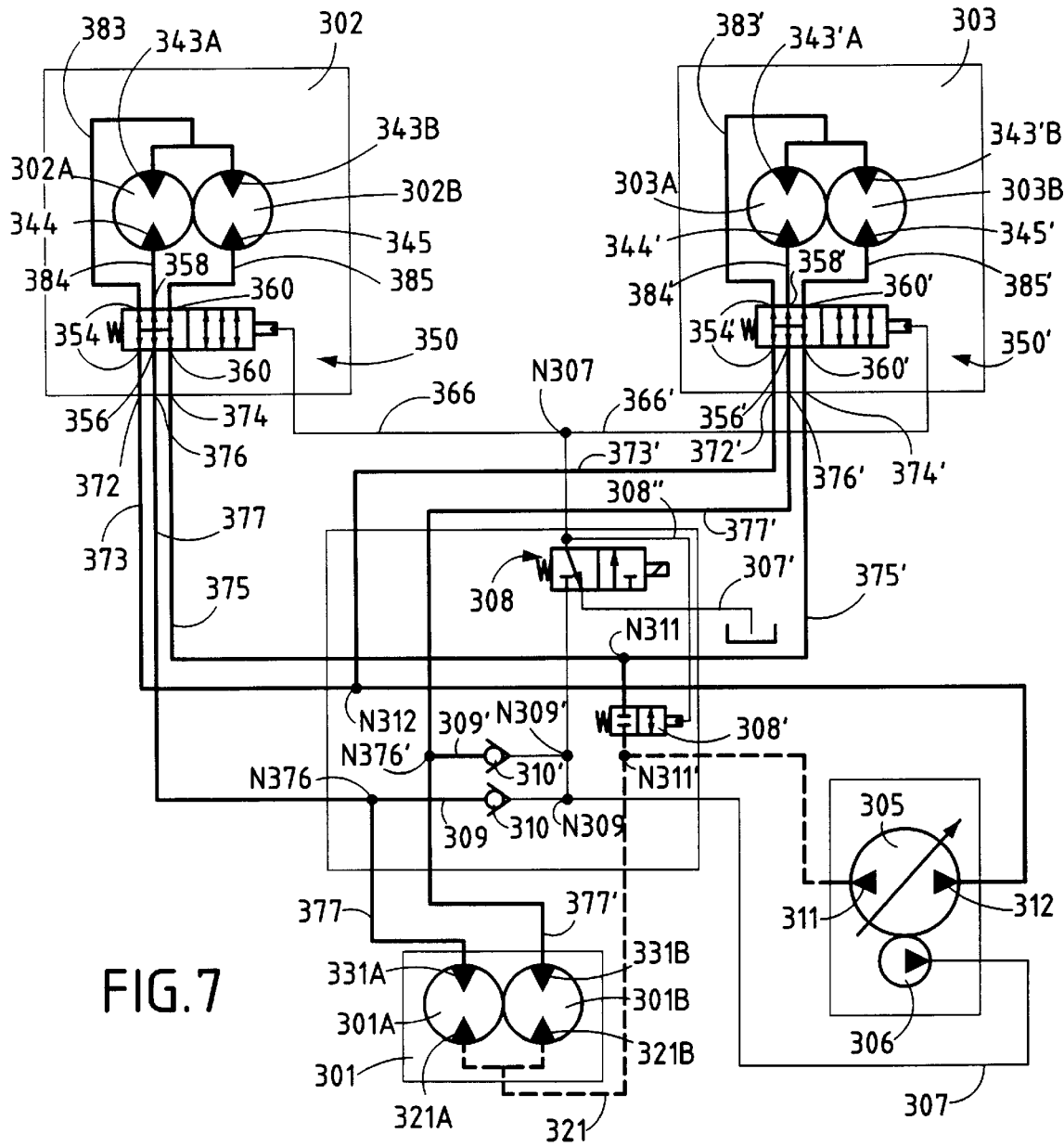
FIG. 7 is the schematic of a control circuit integrating two motors equipped with a selector as shown in FIG. 6, for one position of the selector.

FIG. 7 shows a control circuit using two motors equipped with the selector from FIG. 6. This circuit is similar overall to those from FIGS. 2, 3 and 5 and FIG. 7 uses the same reference numbers as FIG. 5, again increased by 100.

The components of the FIG. 7 circuit are globally the same as those of the FIG. 5 circuit, except that an isolating valve 308' is provided which, in its first position shown in FIG. 7, isolates the second main ducts 374 and 374' from the connector 311 of the pump 305, which is therefore connected only to the duct 321, which is in turn connected to the connectors 321A and 321B of the half-motors 301A and 301B of the motor 301. Movement of the valve 308' from its first position to its second position is commanded by a duct 308" connected to the duct 307 between the valve 308 and the node N307. Accordingly, when the valve 308 is in its second position, in which it enables fluid to be fed to the ducts 366 and 366', the fluid flowing in the duct 308" moves the valve 308' to its second position, in which it connects the ducts 374 and 374' to the connector 311 of the pump 305. The fluid then flows as shown in FIG. 2.

In the first position of the slides of the selectors 350 and 350' the four grooves of the selectors are connected to each other with the result that all the connectors of the motors 302 and 303 communicate with each other and are connected to the pump connector 312. Accordingly the motors 302 and 303 are inactivated. The connectors 331A and 331B of the half-motors 301A and 301B of the motor 301 are also connected to the same pump connector 312, the connector 311 of which is connected to the connectors 321A and 321B. Accordingly the two half-motors of the motor 301 operate normally. In this case, only the drive member(s) coupled to the motor 301 is (are) driven. The drive members coupled to the motors 302 and 303 freewheel. The benefit of this configuration is a higher vehicle speed with a single drive wheel driven by the motor 301.

The second position of the selectors 350 and 350' is obtained in the second position of the valve 308, in which case the valve 308' is also in its second position. This procures a flow similar to that of FIG. 2, in which the motors 302 and 303 are activated, the connectors 331A and 331B of the motor 301 being connected in series to the respective distribution ducts 344 and 344' of the two half-motors 302A and 303A. The other connections are parallel connections.

Figure 8:
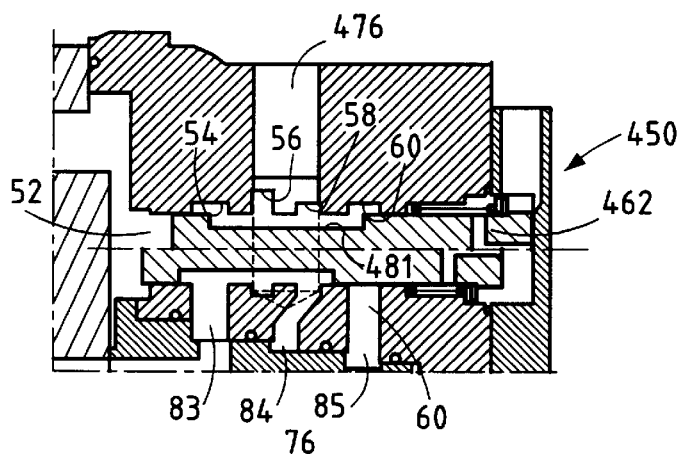
FIG. 8 is an a view analogous to FIGS. 4 and 6 for another embodiment.

FIG. 8 shows another embodiment of a selector 450 whose slide is designated by the reference number 462. This slide has a single selection groove 481 which in its first position, shown in the top part of FIG. 8, establishes communication between the four grooves 54, 56, 58 and 60 of the bore 52. In this position the situation is similar to that occurring in the first position of the slide 362 from FIG. 6, the motor being inactivated because all of its connection ducts are connected to each other.

In the second position of the slide 462, shown in the bottom half of the figure, the selection groove 481 establishes communication between the grooves 54, 56 and 58 of the bore and one of the communication grooves (the groove 60) is isolated. In this situation the first and third connection ducts 83 and 84 of the motor are in communication while the second connection duct 85 is isolated. The second position of the slide 462 therefore yields a situation similar to that occurring when the slide 62 from Figure occupies its second position. In this embodiment, the slide having a single selection groove, the communication groove isolated in the second position of the slide is towards one end of the bore (in the example shown this is the case with the two grooves 54 and 60).

Two motors equipped with the selector 450 can be placed in a control circuit similar to that from FIG. 7, in which they respectively replace the motors 302 and 303. In the first position of the slide 462 the fluid flow is the same as in FIG. 7, both motors equipped with the selector 450 being inactivated.

On the other hand, in the second position of the slide 462, the fluid flow is the same as in FIG. 3, only the first half-motors of the motors equipped with the selector 450 being inactivated while the second half-motors are activated and connected in parallel with the motor 301.

The additional duct 476 of the motor from FIG. 8 can be made in the same way as the duct 376 from FIG. 6 and permanently connect the grooves 56 and 58. This is not necessary, however, and this duct could be replaced by an additional duct similar to the duct 76 from FIG. 4 so as to be connected only to the first branch groove. The selection groove 481 has a length substantially equal to the maximal distance between the two end ducts of the bore with the result that the two branch ducts 56 and 58 communicate regardless of the position of the slide 462.

Figure 9:
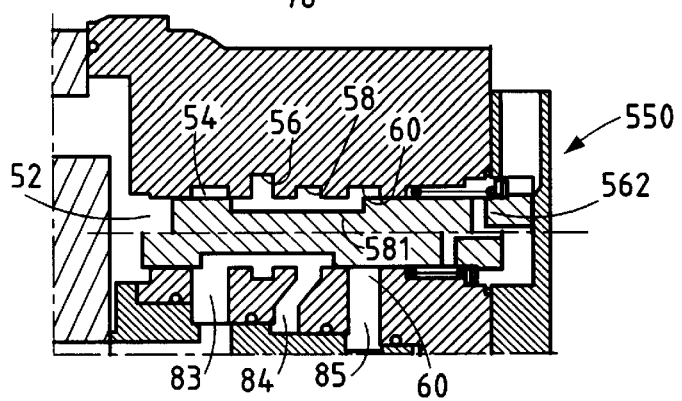
FIG. 9 is a view analogous to FIG. 8 for a further embodiment.

FIG. 9 shows another embodiment in which the selector 550 is equipped with a slide 562 which has a single selection groove 581. This figure does not show the additional duct, which can be similar to the duct 476 from FIG. 8 or the duct 76 from FIG. 4.

In the first position of the slide 562 the communication groove 54 is isolated but the two branch grooves 56 and 58 and the second communication groove 60 communicate via the selection groove 581. On the other hand, in the second position of the slide 562 it is the second communication groove 60 that is isolated while the first communication groove 54 is connected to the branch grooves 56 and 58 which are in turn connected to each other.

Figure 10:
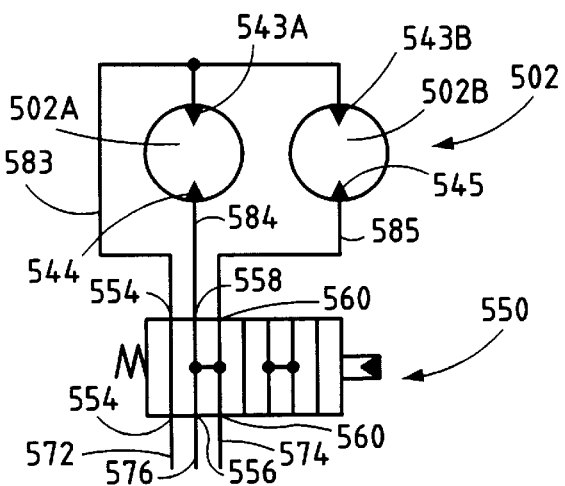
FIG. 10 is a partial schematic of the control arrangements of a motor of the above kind.

FIG. 10 shows diagrammatically the connections of two half-motors 502A and 502B of a motor 502 equipped with the selector 550. In the first position of the slide of this selector the distribution ducts 543A and 543B of these half-motors are both connected to the first main duct 572 by the first connection duct 583 and the first communication groove 554. The distribution ducts 544 and 545 of the half-motors 502A and 502B are connected to the second main duct 574 and to the additional duct 576, these ducts communicating by virtue of the position of the slide that establishes communication between the grooves 556, 558 and 560, with the result that the second and third connection ducts 585 and 584 communicate with each other and with the ducts 576 and 574. In this position the two half-motors of the motor 502 are activated and these motors operate at full capacity. On the other hand, in the second position of the slide 562 only the half-motor 502B is activated, the distribution ducts 543A and 544 of the half-motor 502A and the distribution ducts 543B of the half-motor 502B being connected to the first main duct 572 and to the additional duct 576, which communicate with each other. Two motors similar to the motor 502 can be used in a control circuit similar to that from FIG. 3, respectively replacing the motor 102 and the motor 103. In a second position of the selector 550 the flow is the same as in FIG. 3. On the other hand, in the first position the two capacities of the half-motors similar to the motor 502 are activated while the motor similar to the motor 101 equipping the same circuit is inactivated because all its connectors are connected to the ducts 572 and 576 which are in turn connected to the same pump outlet connector.

Figure 11:
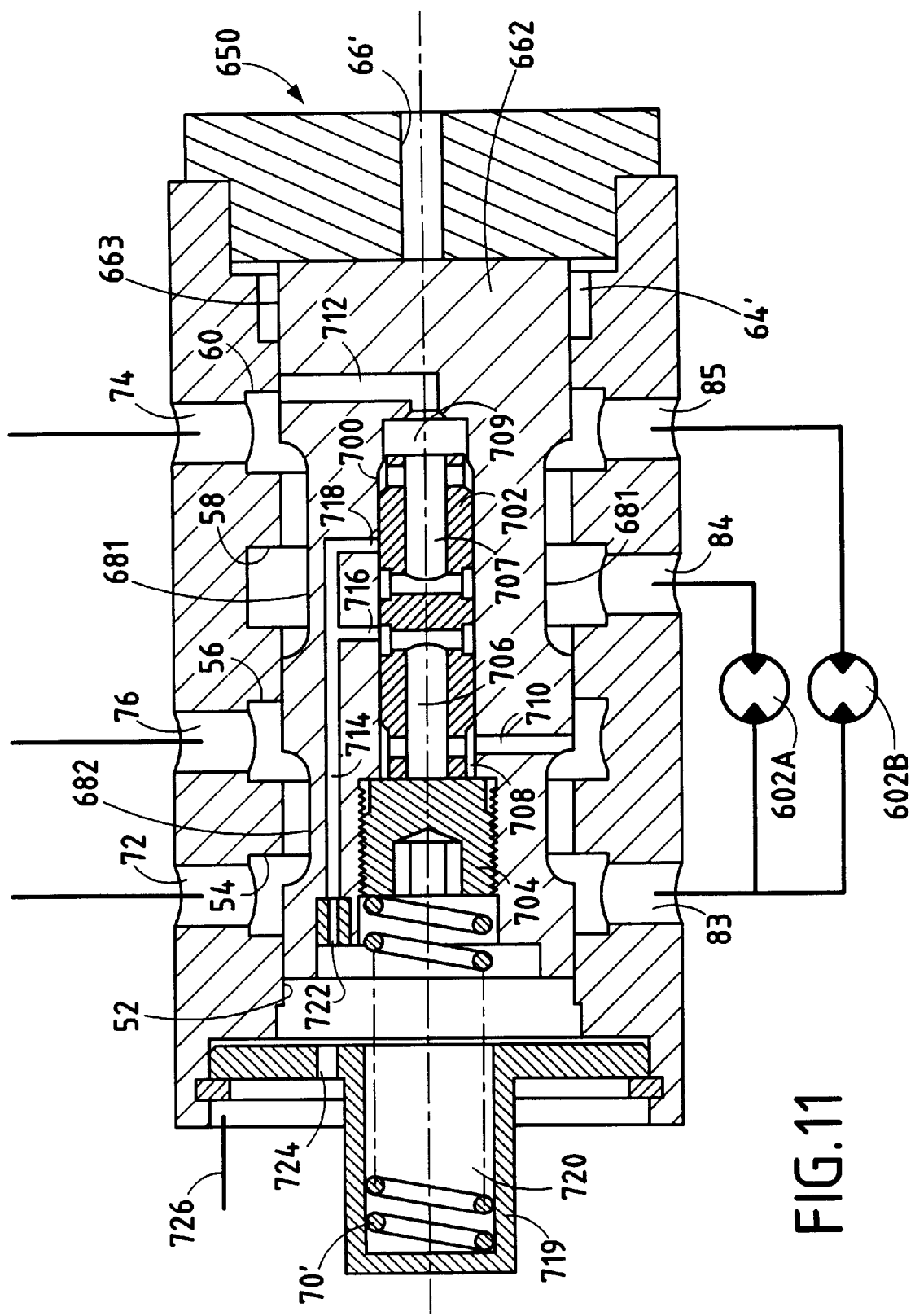
FIGS. 11 and 12 are partial diagrammatic views showing in axial section the selector of a still further embodiment of a motor, together with the circuit feeding the motor.
Figure 12:
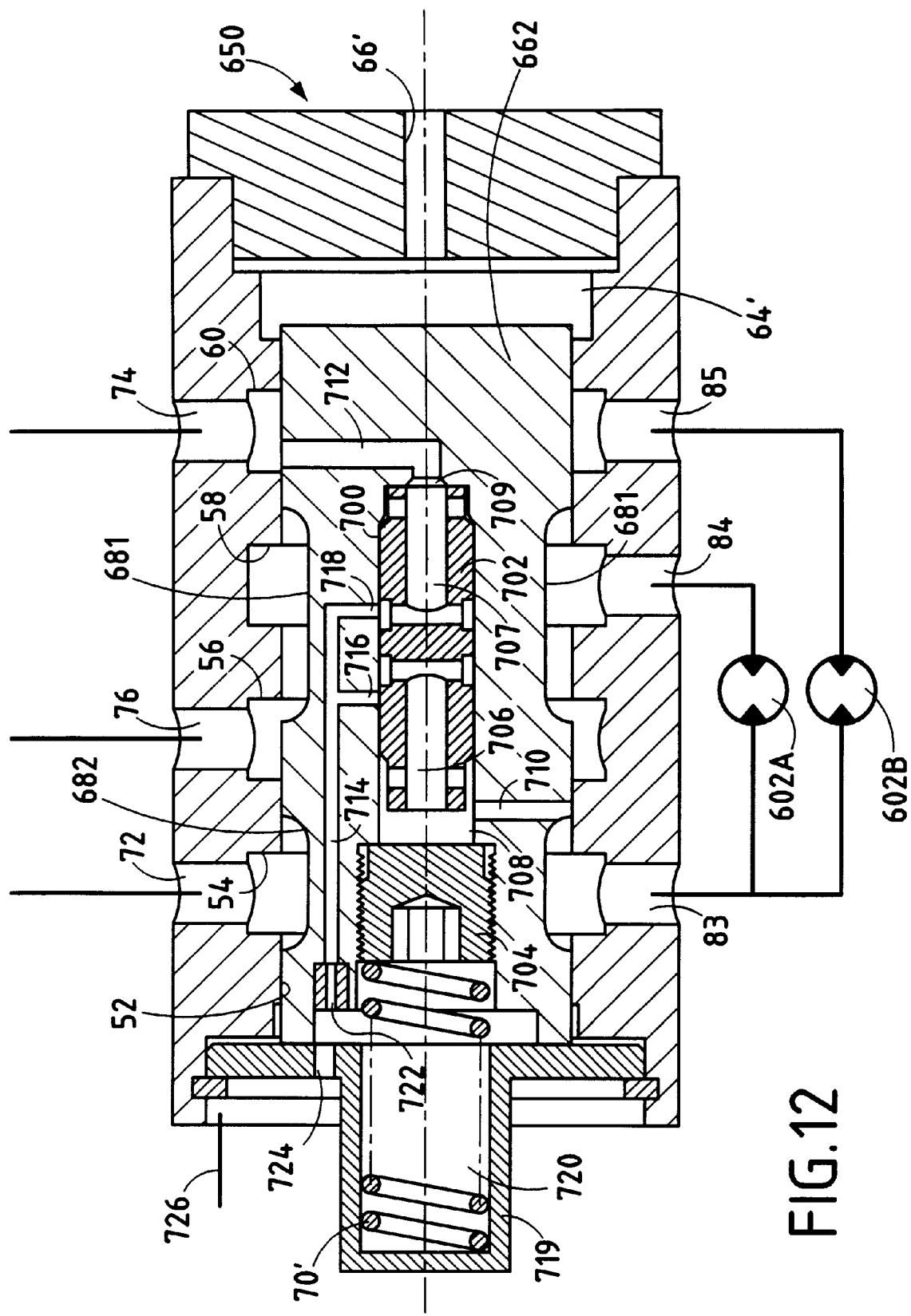

FIGS. 11 and 12 show a configuration of the selection grooves 681 and 682 of the slide 662 of the selector 650 similar to that of the grooves 281 and 282 from FIG. 4. The pilot chamber 64' can be fed with fluid via the external duct 66' to command movement of the slide 662 against the action of the return spring 70' located at the opposite end of the chamber 64' between its respective end positions shown in FIG. 11 (chamber 64' not fed) and FIG. 12 (chamber 64' fed).

The selector 650 equips a motor with two different working capacities schematically represented by the two half-motors 602A and 602B.

This motor can be used in the FIG. 5 circuit, like the motors 202 and 203, the first position of the selector 650 (FIG. 11) and its second position (FIG. 12) respectively corresponding to the first and second positions of the selector 250 from FIG. 4.

However, in the embodiment shown in FIGS. 11 and 12 the slide 662 itself has a bore 700 that is stopped by a plug 704 (on which the spring 70' bears) and which forms a housing in which slides a shuttle valve 702 which includes two separate chambers 706 and 707 and delimits in the bore 700 two end chambers 708 and 709 respectively communicating with the chambers 706 and 707. A duct 710 of the slide 662 connects the second selection groove 682 and the chamber 708 and a duct 712 extends between the chamber 709 and the cylindrical face 663 of the slide. Accordingly, in the two positions of the slide 662 the chambers 706 and 707 are respectively connected to the first main duct 72 and to the second main duct 74.

Accordingly, the means controlling movement of the shuttle valve (702) between its two positions comprise a first control chamber (chamber 708) connected to the first main power duct 702 by a first control duct (duct 710) and a second control chamber (chamber 709) connected to the second main power duct 74 by a second control duct (duct 712).

A sampling duct 714 has two separate branches 716 and 718 which open into the bore 700. Depending on the position of the shuttle valve 702 the branch 716 communicates with the chamber 706 or the branch 718 communicates with the chamber 707. The duct 714 includes a calibrated constriction 722 and its end far from the branches 716 and 718 opens into a chamber 720 that communicates with the chamber of the casing of the motor via communication orifice(s) 724.

The bore 52 is closed at the end opposite the pilot chamber 64' of the slide 662 by a plug 719 which supports the spring 70' and incorporates the orifice(s) 724; the chamber 720 is formed between the inside face of this plug and the slide 662.

In FIG. 11 it is the duct 74 that is connected to the high pressure feed with the result that the chamber 709 is filled with fluid while the chamber 708 has its minimal volume, the duct 72 providing the fluid exhaust. In this first position of the shuttle valve the sampling duct 714 is connected to the low pressure duct 72 by the duct 710, the chamber 706 and the branch 716.

On the other hand, in FIG. 12, the ducts 72 and 74 are respectively connected to the high pressure feed and to the exhaust. It is therefore the chamber 708 that is filled with fluid and the shuttle valve occupies its second position in which the sampling duct 714 is connected to the low pressure duct 74 by the duct 712, the chamber 709 and the branch 718. The branch 716 is blocked by the cylindrical face of the shuttle valve.

The shuttle valve 702 establishes communication between the sampling duct 714 and whichever of the main ducts 72 and 74 is serving as the fluid exhaust duct. In the embodiment shown in FIGS. 11 and 12 this applies whether the slide 662 is in its first or second position. Accordingly, in FIG. 11, the duct 66' does not feed the chamber 64' and the slide 662 is in its first position. If, in this position, the rotation direction of the motor is reversed by respectively having the ducts 72 and 74 serve as the feed duct and as the exhaust duct, the high pressure duct 72 fills the chamber 708 with the result that the position of the shuttle valve relative to the slide 662 is the same as in FIG. 12.

Conversely, FIG. 12 shows the slide 662 in its second position, the chamber 64' being filled with fluid. If, in this position of the slide, the feed and exhaust are interchanged, the shuttle valve 702 takes up the FIG. 11 position relative to the slide 662.

The shuttle valve is used to sample fluid on the low pressure side (and therefore without affecting the operation of the motor) via a duct 726 leading into the casing, for example to cool the fluid before re-injecting it into the closed feed circuit of the motor.

FIGS. 11 and 12 show the shuttle valve equipping a selector of the type shown in FIG. 4. A shuttle valve of the above kind could equally be used in selectors of the type shown in FIGS. 6, 8 and 9. In particular, the slide 662 could replace the slide 362 from FIG. 6. As mentioned with reference to FIG. 6, the motor is inactivated when the slide is in its first position. In this case, the ducts 72, 74 and 76 are at the same pressure and apply the same pressure to the control ducts of the shuttle valve, with the result that the latter is not positively commanded to its first or to its second position, but this is not a problem because the motor is inactivated. In any event, even in this situation, the sampling duct is connected to whichever of the two ducts 72 and 74 is at the lower pressure, because these two ducts are at the same pressure. On the other hand, when the slide is in its second position, the situation is the same as in FIG. 12.

To adapt the shuttle valve to the slide 462 from FIG. 8 it is sufficient to have the first control duct 710 open into the selection groove 481 and the second control duct open onto the cylindrical face of the slide so that it is connected to the groove 60 and to the duct 85 and isolated from the grooves 54, 56 and 58 in the second position of the slide.

Finally, to adapt the shuttle valve to the slide 562 from FIG. 9 it is sufficient to have the first control duct 710 open onto the cylindrical face of the slide so that it is connected to the groove 54 and to the duct 83 but isolated from the grooves 56, 58 and 60 in the first position of the slide and remains connected to the groove 54 and to the duct 83 in the second position of the slide, whereas the second control duct 712 opens onto the cylindrical face of the slide so that it is connected to the groove 60 and to the duct 85 but isolated from the grooves 54, 56 and 58 in the second position of the slide and remains connected to the slide 60 and to the duct 85 in the first position of the slide.

What is claimed is:

1. A pressurized fluid motor comprising:
   a casing which includes two main power ducts, respectively a fluid feed duct and a fluid exhaust duct;
   a cylinder block which includes a plurality of cylinders each equipped with a piston, said cylinders being disposed radially relative to an axis and adapted to be fed with pressurized fluid;
   a reaction member adapted to cooperate with the pistons, said reaction member and the cylinder block being able to rotate relative to each other about the axis;
   an internal fluid distributor rotating with the reaction member about the rotation axis and having distribution ducts adapted to communicate with the cylinders, said distribution ducts being divided into three groups of distribution ducts; and a selector comprising a bore and a slide, the bore having a substantially cylindrical face with at least three grooves, the two main ducts and three connection ducts which are respectively connected to each of the three groups of distribution ducts being connected to said bore, the slide being mounted in the bore and having at least a first selection groove on its outside periphery, said slide being adapted to be moved between two positions in which said selection groove isolates and/or establishes communication between certain grooves of said bore, the motor including an additional power duct constituting a fluid feed duct or a fluid exhaust duct, wherein the bore of the selector has four annular grooves on said substantially cylindrical face and spaced from each other, said grooves comprising two "communication" grooves and two "branch" grooves, a first of the two main ducts and the first connection duct being permanently connected to the first communication groove, the second of the two main ducts and the second connection duct being permanently connected to the second communication groove, the additional duct being permanently connected to the first branch groove and the third connection duct being permanently connected to the second branch groove, and wherein the first selection groove of the slide is adapted to establish communication between the two branch grooves of the bore.

2. A motor according to claim 1, wherein, the grooves of the bore of the selector being numbered from 1 through 4 when considered in turn from a first to a second end of the substantially cylindrical face of the bore, the first and fourth grooves are communication grooves and the second and third grooves are branch grooves.

3. A motor according to claim 1, wherein the branch grooves are blind grooves, only the additional duct is permanently connected to the first branch groove and only the third connection duct is permanently connected to the second branch groove.

4. A motor according to claim 1, wherein the slide has a single selection groove adapted to establish communication between the two branch grooves and to isolate them from the communication grooves when the slide occupies its second position and adapted to establish communication between the two branch grooves and one of the communication grooves but to isolate the other communication groove when the slide occupies its second position.

5. A motor according to claim 2, wherein the slide has first and second selection grooves such that:

in the first position of the slide the first communication groove and the first branch groove communicate via the second selection groove and are isolated from the second branch groove and from the second communication groove whereas the second branch groove and the second communication groove communicate via the first selection groove and are isolated from the first branch groove and from the first communication groove, and in the second position of the slide the first communication groove is isolated from the other grooves of the bore, the first and second branch grooves communicate via the first selection groove and the second communication groove is isolated from the other grooves of the bore.

6. A motor according to claim 5, wherein, in the second position of the slide, the second selection groove faces one of the communication grooves.

7. A motor according to claim 2, wherein the first and second branch grooves are in permanent communication via a permanent communication duct, and wherein the slide has first and second selection grooves such that:

in the first position of the slide the first communication groove, the first branch groove, the second branch groove and the second communication groove communicate via the first and second selection groove and via said permanent communication duct and in the second position of the slide the first communication groove is isolated from the other grooves of the bore, and the second communication groove is isolated from the other grooves of the bore.

8. A motor according to claim 2, wherein the slide has a single selection groove adapted to establish communication between the two branch grooves and the second communication groove and to isolate them from the first communication groove when the slide occupies its first position and adapted to establish communication between the first communication groove and the two branch grooves and to isolate them from the second communication groove when the slide occupies its second position.

9. A motor according to claim 1, wherein the slide has a single selection groove adapted to establish communication between the four grooves of the bore when the slide occupies its first position and adapted to isolate one of the communication grooves that is towards one end of the bore whilst establishing communication between the other grooves of the bore when the slide occupies its second position.

10. A motor according to claim 1, wherein the slide of the selector has a housing in which there is disposed a shuttle valve mobile between two positions inside said housing and moved between said two positions by control means, wherein the selector includes a sampling duct connected to a fluid exhaust and wherein in each of its two positions the shuttle valve is adapted to establish communication between said sampling duct and whichever of the main power ducts is at the lower pressure.

11. A motor according to claim 10, wherein the means controlling the position of the shuttle valve comprise a first control chamber connected to the first main power duct by a first control duct and a second control chamber connected to the second main power duct by a second control duct.

12. A motor according to claim 7, wherein the second position of the slide, the second selection groove faces one of the communication grooves.

* * * * *